Feb. 25, 1969  E. BIRKETT  3,429,479
HOPPERING AND ORIENTING DEVICE
Filed Dec. 5, 1967
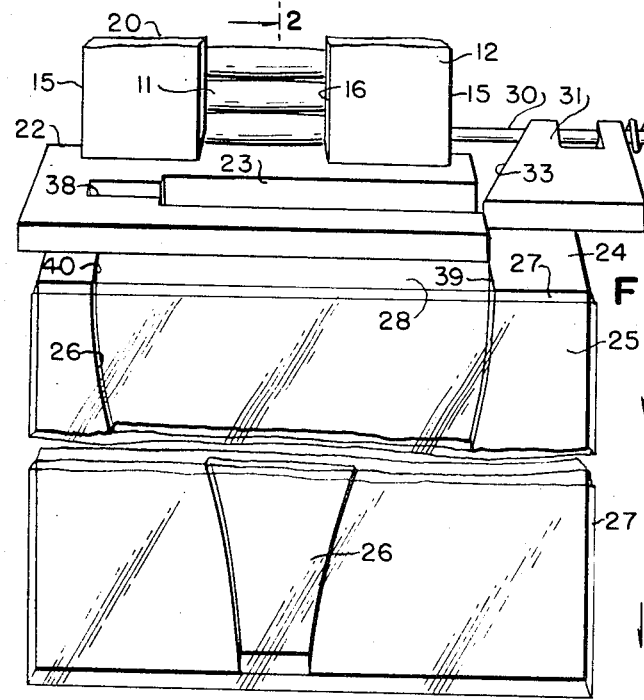
FIG.1
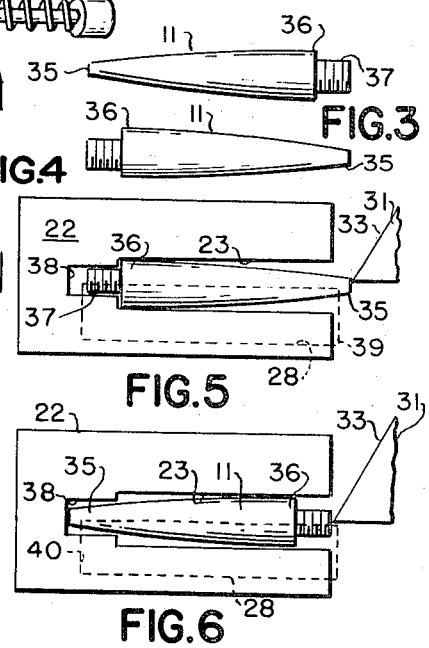
FIG.3
FIG.4
FIG.5
FIG.6
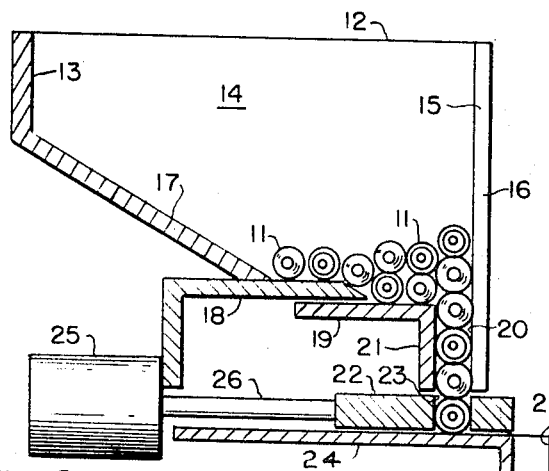
FIG.2
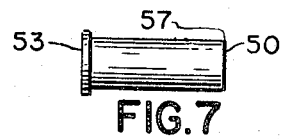
FIG.7
FIG.8
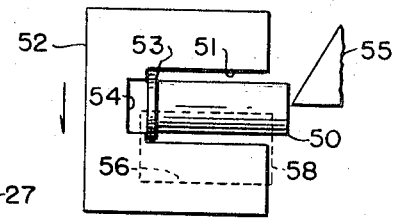
FIG.9
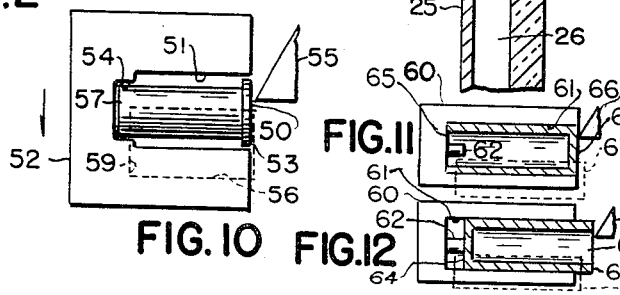
FIG.10  FIG.11  FIG.12
INVENTOR:
EARL BIRKETT
BY Peter L. Tailer
ATTORNEY

United States Patent Office 3,429,479
Patented Feb. 25, 1969

3,429,479
HOPPERING AND ORIENTING DEVICE
Earl Birkett, West Hempstead, N.Y.
(392 W. Broadway, New York, N.Y. 10012)
Filed Dec. 5, 1967, Ser. No. 688,149
U.S. Cl. 221—172                                          6 Claims
Int. Cl. B23q 7/12

ABSTRACT OF THE DISCLOSURE

Irregular elongated objects having a large end or an internal irregularity are delivered large end first or open end up by being moved laterally while in the cavity of a reciprocating slide over a delivery opening which is shorter than the length of the elongated objects. If the objects are disposed one way in the slide cavity, their large or closed ends prevent longitudinal motion and they fall into the delivery opening. If the objects are disposed the other way in the slide cavity, they are moved longitudinally in the slide cavity as they pass a spring mounted element so that their large or closed ends fall into the delivery opening.

Background of the invention

It is old in the hoppering and delivery device art to provide a simple device to deliver elongated objects having a large end small end first into a delivery chute. This is accomplished by providing a slide containing a cavity to laterally move the objects over a delivery opening, the delivery opening having end portions which will only accommodate the small ends of the objects. Thus, the small ends of the objects drop first into the delivery opening to deliver the elongated objects into a delivery chute small end first regardless of the orientation of the objects in the slide cavity.

Elaborate devices are now used which have a sensing element and a number of activated moving parts to deliver elongated objects large end first into a delivery chute. There is a need for a simple, foolproof, and inexpensive device to accomplish this end. The elongated objects which must be delivered large end down may be ball point pen barrels which are assembled into pens in automatic machines with the pen barrels up. This requires that the pen barrels be delivered from random orientation in a hopper large end down to drop into place over pen cartridges standing upward in pen caps. Other elongated objects which should be delivered large end down are cartridge cases for firearms which may be automatically charged with primers from below and powder and projectiles from above. Elongated objects which are internally irregular are lipstick cases which are of uniform outer diameter but are sealed or closed at one end.

Summary of the invention

Irregular objects having a large end or an internal irregularity are removed from under a hopper by a reciprocating slide containing a cavity to receive an object. The cavity has means at one end to prevent longitudinal motion of an irregular object if the object is oriented in a given direction and to permit longitudinal motion if the object is oriented in the other direction. The slide moves past a spring mounted element which urges objects in the cavity towards the means therein preventing longitudinal motion of the objects. The slide then moves the elongated objects over a delivery opening shorter than the length of the objects. According to whether the objects have been moved longitudinally or not in the cavity, they fall large end down in the delivery opening or with an internal irregularity down in the delivery opening.

Thus the delivery device of this invention uses the configuration of a cavity in a slide to determine whether a spring mounted element past which an elongated object is moved by the slide will move the elongated object longitudinally. The selective longitudinal motion of the objects positions them to fall large end or desired end downward into the delivery opening of a delivery chute.

Brief description of the drawing

FIGURE 1 is a front perspective view from above of the device of my invention with portions broken away;

FIGURE 2 is a longitudinal section taken on line 2—2 of FIGURE 1;

FIGURES 3 and 4 are side views of pen barrels to be delivered and oriented by the device of my invention;

FIGURES 5 and 6 are top views of a slide and a fragment of the spring mounted element with a pen barrel being shown in the cavity of the slide passing the spring mounted element and with the position of a delivery chute opening being indicated by dotted lines;

FIGURES 7 and 8 are side views of firearm cartridge cases to be delivered and oriented by the device of this invention;

FIGURES 9 and 10 are top views of a slide and a fragment of a spring mounted element with a cartridge casing being shown in the cavity of the slide passing the spring mounted element and with the position of a delivery chute opening being indicated by dotted lines; and FIGURES 11 and 12 are top views of a slide and a fragment of a spring mounted element with a lipstick case being shown in the cavity of the slide in longitudinal section and with the position of a delivery chute opening being indicated by dotted lines.

Description of the preferred embodiments

As shown in FIGURES 1 and 2, pen barrels 11 are disposed with a random longitudinal orientation in hopper 12. Hopper 12 has a rear wall 13, side walls 14, and a front wall 15 with a central opening 16 formed therein if it is desired to view the objects 11 in the hopper 12. A sloping bottom wall 17 urges objects 11 forward to roll or slide over the base members 18 and 19 into the hopper delivery chute 20 which is formed by the vertical wall 21 and the front wall 15.

A slide 22 containing a cavity 23 is mounted below chute 20 on table 24. Slide 22 is reciprocated by cylinder 25 by means of rod 26 from the withdrawn position shown in FIGURE 2 in which the cavity 23 underlies chute 20 to an extended position as will be hereinafter described.

Table 24 has a vertical front portion 25 with a channel cut out in it to form a delivery chute 26. A glass cover 27 on front portion 25 forms a wall of chute 26. Thus cover 27 and the upper portion of chute 26 form a delivery opening 28. When slide 22 is extended, cavity 23 is disposed over delivery opening 28.

Referring further to FIGURE 1, a rod 30 has an element 31 slidably mounted on it to rest on table 24 adjacent to one end of slide 22. A compression spring 32 is fixed about rod 30 to return element 31 to the position shown if it is moved away from slide 22. The edge 33 of element 31 adjacent to slide 22 is disposed at an angle to it.

Referring now to FIGURES 1-6, pen barrels 11 are disposed in either of the two orientations shown in FIGURES 3 and 4 in hopper 12. If a pen barrel 11 falls into cavity 23 of slide 22 as shown in FIGURE 5, the large butt 36 of pen barrel 11 cannot enter the small portion 38 of cavity 23 so that forward motion of slide 22 will cause the projecting tip 35 to ride along edge 33 of element 31 and move element 31 to the right as shown. As slide 22 moves pen barrel 11 over the delivery opening 28, tip 35 strikes and rests on edge 39 of opening 28 so that the pen barrel 11 falls large end down therein. As shown in FIGURE 1, chute 26 narrows to deliver pen barrels 11 in the large end down position.

If a pen barrel 11 falls into cavity 23 of slide 22 as shown in FIGURE 6, the edge 33 of element 31 moves pen barrel 11 laterally or longitudinally in cavity 23 to urge tip 35 into the narrow portion 38 of cavity 23. When the longitudinally shifted pen barrel 11 is then moved over delivery opening 28, its tip 35 strikes edge 40 of delivery opening 28 so that pen barrel 11 falls large end down into the delivery chute 26. Thus elongated elements, such as pen parts, which have a large end may be hoppered and oriented to be delivered large end down by the device of my invention.

Referring now to FIGURES 7–10, my invention may be modified to hopper and orient many types of objects. Cartridge casings 50, oriented in a hopper as shown in FIGURES 7 and 8, are disposed over a slide 52. As may be seen in FIGURE 9, a cartridge casing 50 oriented as shown has fallen into the cavity 51 of a reciprocating slide 52. Casing 51 is prevented by its larger head 53 from entering the narrow portion 54 of cavity 51. Thus, the passage of slide 52 and cartridge 50 deflects spring mounted element 55 to the right as shown. When casing 50 is moved over delivery opening 56, its small end 57 strikes edge 58 of opening 56 so that casing 50 falls with its head 53 downward into delivery opening 56.

As shown in FIGURE 10, a cartridge casing 50, oriented as shown, has its small end 57 urged into the narrow portion 54 of cavity 51 by the spring mounted element 55. This longitudinal motion of a cartridge 50 causes its small end 57 to strike edge 59 of delivery opening 56 to fall therein head end down.

FIGURES 11 and 12 show a modification of this invention in which a slide 60 contains a cavity 61 without a narrow portion but with a central pin or projection 62 at one end. If lipstick cases 63 are oriented with their closed ends 64 disposed towards pin 62, their longitudinal motion urged by spring mounted element 66 will be prevented. This is shown in FIGURE 12 and in this position the case 63 will fall closed end down in delivery opening 67.

As shown in FIGURE 11, if a lipstick case is oriented in cavity 61 with its open end 65 disposed towards pin 62, it will be moved longitudinally so that it will also fall closed end down into delivery opening 67. This modification of my invention may be used to orient externally irregular elongated objects which have an opening at one end larger than any opening at the other end. Thus, pin 62 may enter one end of the objects and not the other to allow their selective orientation.

Several modifications of my invention will be apparent to those skilled in the mechanical arts. For example, the cavity 23 in the slide 22 need not be open adjacent to element 31. If this end of cavity 23 is closed, element 31 may extend in a horizontal slot or cut-out in slide 22 to contact objects being hoppered. Also, if desired, all objects being hoppered may be moved longitudinally in cavity 23 regardless of their orientation. If all objects being hoppered are longitudinally moved in cavity 23, the orientation of a given object will determine how far it enters the narrow part 38 of cavity 23 and thus how far it is laterally moved with relation to the delivery opening 28. In this case different amounts of longitudinal motion allow objects to fall large end down in chute 26.

While I have shown and described my invention in the best forms known to me, it will nevertheless be understood that these are purely exemplary and that modifications may be made without departing from the spirit and scope of the invention except as it may be more limited in the appended claims.

I claim:

1. A hoppering and orienting device for irregular elongated objects comprising, in combination:

(a) a slide containing an elongated cavity adapted to receive an elongated object therein, said slide having means at one end of said cavity selectively preventing longitudinal motion of an elongated object according to the orientation of the elongated object,
(b) a table containing a delivery opening having ends a distance apart less than the length of said elongated objects, said table being disposed below said slide,
(c) hopper means guiding elongated objects to a position over said slide,
(d) means moving said slide positioning said cavity below said hoppering means to receive an elongated object therein, said means then moving said slide positioning said cavity over said delivery opening, and
(e) spring mounted means opposite the end of said cavity having means preventing longitudinal motion of objects, said spring mounted means urging objects in said cavity being moved past said spring mounted means toward said means preventing longitudinal motion of objects so that said objects are selectively moved longitudinally in said cavity to fall with a desired end down into said delivery opening.

2. The combination according to claim 1 wherein said irregular elongated objects have a large end and a smaller end, and wherein said means at one end of said cavity preventing longitudinal motion of an elongated object according to the orientation of the elongated object is a narrower portion of said cavity wider than the smaller end of said objects and narrower than the large end of said objects, said objects falling large end down into said delivery opening.

3. The combination according to claim 2 wherein said slide has a side with the end of said cavity opposite said means preventing longitudinal motion open to the side of said slide, said spring mounted element having an edge formed at an angle with the side of said slide, said elongated objects being received from said hopper means in the cavity of said slide in a position to extend beyond the open end of said cavity to contact said edge of said spring mounted element while moving therepast.

4. The combination according to claim 1 wherein said irregular elongated objects are hollow with an opening at one end, and wherein said means at one end of said cavity preventing longitudinal motion of an elongated object according to the orientation of the elongated object is a projection from the end of the cavity which may enter the opening at one end of the elongated objects, said objects falling with said opening of said objects upward into said delivery opening.

5. The combination according to claim 4 with the addition of a delivery chute below said table, the upper end of said delivery chute forming said delivery opening, said delivery chute narrowing below said delivery opening.

6. The combination according to claim 1 wherein said means moving said slide reciprocates said slide.

References Cited

UNITED STATES PATENTS

| | | | |
|---|---|---|---|
| 949,647 | 2/1910 | Colbert | 221—172 |
| 1,316,932 | 9/1919 | Vaughn | 221—172 |
| 2,623,803 | 12/1952 | Gamble | 221—172 |
| 2,857,039 | 10/1958 | Whitecar. | |
| 2,875,884 | 3/1959 | Harrington | 221—171 X |
| 2,915,165 | 12/1959 | Bell | 221—171 X |
| 3,108,712 | 10/1963 | Hall | 221—172 |
| 3,166,177 | 1/1965 | Laverty | 221—172 X |

FOREIGN PATENTS 1,015,712    1/1966    Great Britain.

SAMUEL F. COLEMAN, *Primary Examiner.*